United States Patent
Chen et al.

(10) Patent No.: US 7,839,018 B2
(45) Date of Patent: Nov. 23, 2010

(54) METHOD AND SYSTEM OF HYBRID POWER MANAGEMENT

(75) Inventors: Charn-Ying Chen, Taoyuan County (TW); Chi-Yuan Chang, Taoyuan County (TW); Wei-Wei Lin, Taoyuan County (TW); Chih-Lin Huang, Taoyuan County (TW); Yeong-Der Lin, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 296 days.

(21) Appl. No.: 12/181,456

(22) Filed: Jul. 29, 2008

(65) Prior Publication Data

US 2009/0261657 A1    Oct. 22, 2009

(30) Foreign Application Priority Data

Apr. 22, 2008    (TW) .............................. 97114575 A

(51) Int. Cl.
*H02J 1/00* (2006.01)
*H02J 7/34* (2006.01)
(52) U.S. Cl. .............................. 307/46; 307/44; 307/45; 307/48; 307/80
(58) Field of Classification Search .................. 307/44, 307/45, 46, 48, 80
See application file for complete search history.

(56) References Cited

U.S. PATENT DOCUMENTS

| 2006/0029846 A1* | 2/2006 | Konoto et al. | 429/23 |
| 2006/0197382 A1* | 9/2006 | Chou et al. | 307/48 |
| 2008/0203816 A1* | 8/2008 | Fujita | 307/48 |

FOREIGN PATENT DOCUMENTS

| TW | 200518371 | 11/1992 |
| TW | 200735444 | 11/1995 |

* cited by examiner

*Primary Examiner*—Hal I Kaplan
(74) *Attorney, Agent, or Firm*—WPAT, PC; Justin King

(57) ABSTRACT

A method of hybrid power management is provided in the present invention, comprising steps of: providing a hybrid power output device being coupled to a load and comprising a fuel cell module and a secondary cell module; determining a plurality of threshold values, each representing one of output power modes of the hybrid power output device respectively; and monitoring a characteristic value output from the fuel cell module and comparing the characteristic value with the threshold values to determine one of the output power modes to supply power to the load. Moreover, the present invention further provides a system of hybrid power management using the foregoing method to control switches to select from the output power modes such as supplying power from the fuel cell module only, from both the fuel cell module and the secondary battery, or cutting off power supply to the load according to the power state of the fuel cell module.

12 Claims, 9 Drawing Sheets

| Switch State / Voltage of Fuel Cell Module (V) | 1st Switch | 2nd Switch |
|---|---|---|
| 1st Th. Value 8.6V | OFF | ON |
| 2nd Th. Value 8V | ON | ON |
| 3rd Th. Value 7.6V | ON | OFF |

FIG. 3

| Switch / Switch State / Voltage of Fuel Cell Module (V) | Voltage Dropping From 1st Th. Value | | Voltage Rising From 4th Th. Value | |
|---|---|---|---|---|
| | 1st Switch | 2nd Switch | 1st Switch | 2nd Switch |
| 1st Th. Value 8.6V | OFF | ON | OFF | ON |
| 2nd Th. Value 8.2V | OFF | ON | ON | ON |
| 3rd Th. Valu 8V | ON | ON | ON | OFF |
| 4th Th. Value 7.6V | ON | OFF | ON | OFF |

FIG. 5

METHOD AND SYSTEM OF HYBRID POWER MANAGEMENT

BACKGROUND OF THE INVENTION

1. Field of the Invention

The present invention generally relates to a power control method and a power control system using the same and, more particularly, to a method of hybrid power management and a system of hybrid power management, in which one of different output power modes is selected according to a characteristic value output from a fuel cell module.

2. Description of the Prior Art

The fuel cell has attracted tremendous attention as an alternative energy because it is free of pollution, high-efficiency, low-noise, low-vibration, fast start-up and long duration. Especially, the awakening in environmental conscience has made the fuel cell a potential power source for use in other fields. The fuel cell has advanced so that the power generation performance is improved with reduced material cost is to make the fuel cell commercialized.

However, the power supply process of the fuel cell is restricted to the reaction mechanism therein. For example, it is hard for the fuel cell to provide large power to the load due to slow oxidation and fuel delivery, which leads to failure of the fuel cell because of insufficient momentary power supply. Moreover, the unstable transient state occurs due to reduced fuel concentration during fuel supply.

In order to avoid momentary high-power demand when the load changes or unstable power supply due to the operation of the fuel cell, a capacitor or a secondary cell module is conventionally used. For example, in Taiwan Patent Pub. No. 200518371, a fuel cell device with a secondary cell is disclosed to reduce power consumption during power conversion by adjusting the output voltage of the fuel cell. Moreover, in Taiwan Patent Pub. No. 200735444, the warm-up time for the fuel cell is reduced so that the power generated will not be wasted. In this technique, the fuel cell and the secondary cell generate hybrid power for various applications. During the operations of the secondary cell, the operation of the secondary cell is insufficient to cause lowered output power when it is over-loaded or has operated overtime. Meanwhile, aging of the over-used fuel cell results from high current and low voltage because there is no mechanism in the secondary cell module to avoid reduced output power. Moreover, there is no cut-off voltage for the secondary cell to get recovered in the prior art when the output power of the secondary cell is reduced.

Therefore, there is need in providing a method of hybrid power management and a system of hybrid power management using the method to overcome the aforementioned problems.

SUMMARY OF THE INVENTION

It is an object of the present invention to provide to a method of hybrid power management and a system of hybrid power management, in which one of different output power modes is selected to supply power to the load according to the power state of fuel cell module so as to prevent the output voltage of the fuel cell from dropping due to unstable transient state. Therefore, the fuel cell module can be recovered at unstable transient state to prolong the lifetime of the fuel cell and keep the load operating normally.

In one embodiment, the present invention provides a method of hybrid power management, comprising steps of: providing a hybrid power output device being coupled to a load and comprising a fuel cell module and a secondary cell module; determining a plurality of threshold values, each representing one of a plurality of output power modes of the hybrid power output device respectively; and monitoring a characteristic value output from the fuel cell module and comparing the characteristic value with the threshold values to determine one of the output power modes to supply power to the load.

In another embodiment, the present invention further provides a system of hybrid power management, comprising: a hybrid power output device comprising a fuel cell module and a secondary cell module being electrically coupled to the fuel cell module through a first switch; a load being electrically coupled to the hybrid power output device through a second switch; a sensor unit being capable of monitoring a characteristic value output from the fuel cell module to generate a sensor signal; and a control unit being capable of determining a plurality of threshold values, each representing one of a plurality of output power modes of the hybrid power output device respectively and being capable of receiving the sensor signal and comparing the sensor signal with the threshold values to control the first switch or the second switch to determine one of the output power modes to supply power to the load.

BRIEF DESCRIPTION OF THE DRAWINGS

The objects, spirits and advantages of the preferred embodiments of the present invention will be readily understood by the accompanying drawings and detailed descriptions, wherein:

FIG. 3 is a table showing the relation between threshold values and switch operations according to one embodiment of the present invention;

FIG. 5 is a table showing the relation between threshold values and switch operations according to another embodiment of the present invention.

DETAILED DESCRIPTION OF THE PREFERRED EMBODIMENTS

The present invention can be exemplified but not limited by the preferred embodiments as described hereinafter.

Figure 1:
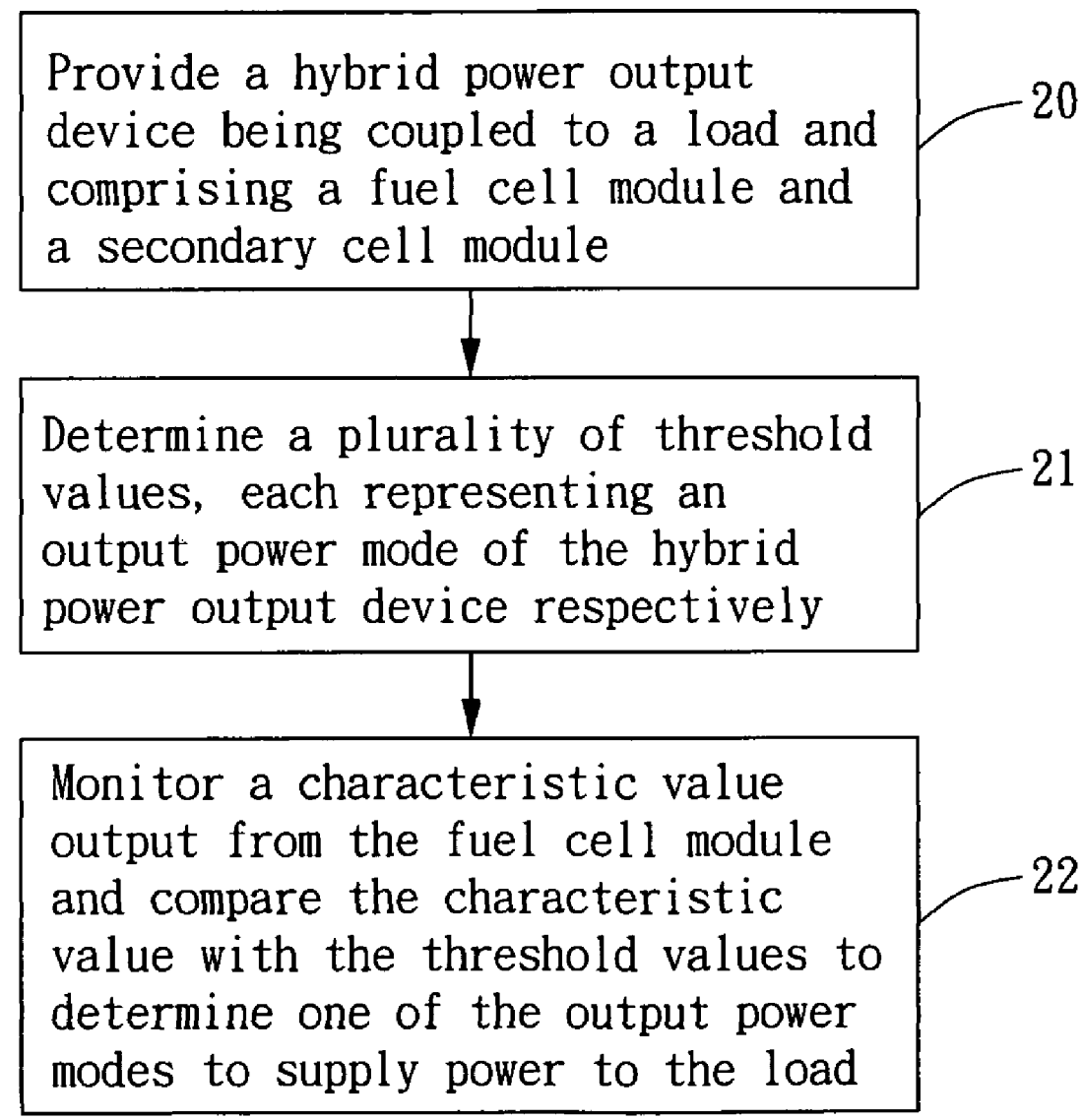
FIG. 1 is a flowchart of a method of hybrid power management according to the present invention.

Please refer to FIG. 1, which is a flowchart of a method of hybrid power management according to the present invention. The method of hybrid power management 2 comprises steps described hereinafter. First, Step 20 is performed to provide a hybrid power output device. The hybrid power output device is coupled to a load and comprises a fuel cell module and a secondary cell module. The fuel cell module can be a direct methanol fuel cell (DMFC) or a solid oxide fuel cell (SOFC), but not restricted thereto. The secondary cell can be a lithium cell, nickel-metal hydride (NiMH) cell or any other rechargeable cell.

Then, in Step 21, a plurality of threshold values are determined. Each threshold value represents an output power mode of the hybrid power output device respectively. The output power mode in this step represents the power simply from the fuel cell module to the load or the power from the fuel cell module and the secondary cell module to the load or the power being cut off instead of being supplied to the load. For example, in one embodiment, the plurality of threshold values comprises a first threshold value, a second threshold value and a third threshold value. More particularly, the first threshold value is 8.6 volts, the second threshold value is 8 volts, and the third threshold value is 7.6 volts. The threshold values are determined based on the fuel cell module and secondary cell module, but are not restricted thereto. More particularly, the first threshold value of 8.6 volts represents the output power mode that the fuel cell module supplies power to the load. The second threshold value of 8 volts represents the output power mode that the fuel cell module and the secondary cell module supply power to the load. Third threshold value of 7.6 volts represents the output power mode that power to the load from the hybrid power output device is cut off and the fuel cell charges the secondary cell module.

In another embodiment, four threshold values are used. In other words, the plurality of threshold values comprises a first threshold value, a second threshold value, a third threshold value and a four threshold value. More particularly, the first threshold value is 8.6 volts, the second threshold value is 8.2 volts, the third threshold value is 8 volts and the fourth threshold value is 7.6 volts. The threshold values are determined based on the fuel cell module and secondary cell module, but are not restricted thereto. More particularly, the first threshold value of 8.6 volts represents the output power mode that the fuel cell module supplies power to the load. The second threshold value of 8.2 volts and the third threshold value of 8 volts represent respectively one selected from the output power mode that the fuel cell module supplies power to the load and the output power mode that the fuel cell module and the secondary cell module supply power to the load according to the trend of the characteristic value. The fourth threshold value of 7.6 volts represents the output power mode that power to the load from the hybrid power output device is cut off.

After the threshold values are determined, Step 22 is performed to monitor a characteristic value output from the fuel cell module and compare the characteristic value with the threshold values to determine one of the output power modes to supply power to the load. The characteristic value represents the output voltage, current or power of the fuel cell module. Since the aforesaid threshold values are voltage values, the characteristic value in this step is the voltage of the fuel cell module. In other words, the output voltage is monitored during the operation of the fuel cell module and is compared to the threshold values defined in Step 21 to determine the output power mode defined in Step 21. Certainly, when the characteristic value is the output current, the plurality of threshold values are current values, as is well-known to those with ordinary skills in the art capable of making modifications within the scope of the present invention. Therefore, the characteristic value of the present invention is not restricted to the output voltage.

The method of the present invention is implemented as described hereinafter. Please refer to FIG. 2A, which is a schematic diagram of a system of hybrid power management according to one embodiment of the present invention. The system of hybrid power management 3 comprises a hybrid power output device 30, a load 34, a sensor unit 35 and a control unit 36. The hybrid power output device 30 comprises a fuel cell module 301 and a secondary cell module 302. The secondary cell module 302 is electrically coupled to the fuel cell module 301 through a first switch 31. The fuel cell module 301 can be a direct methanol fuel cell (DMFC) or a solid oxide fuel cell (SOFC), but not restricted thereto. The secondary cell module 302 can be a lithium cell, nickel-metal hydride (NiMH) cell or any other rechargeable cell.

Figure 2A:
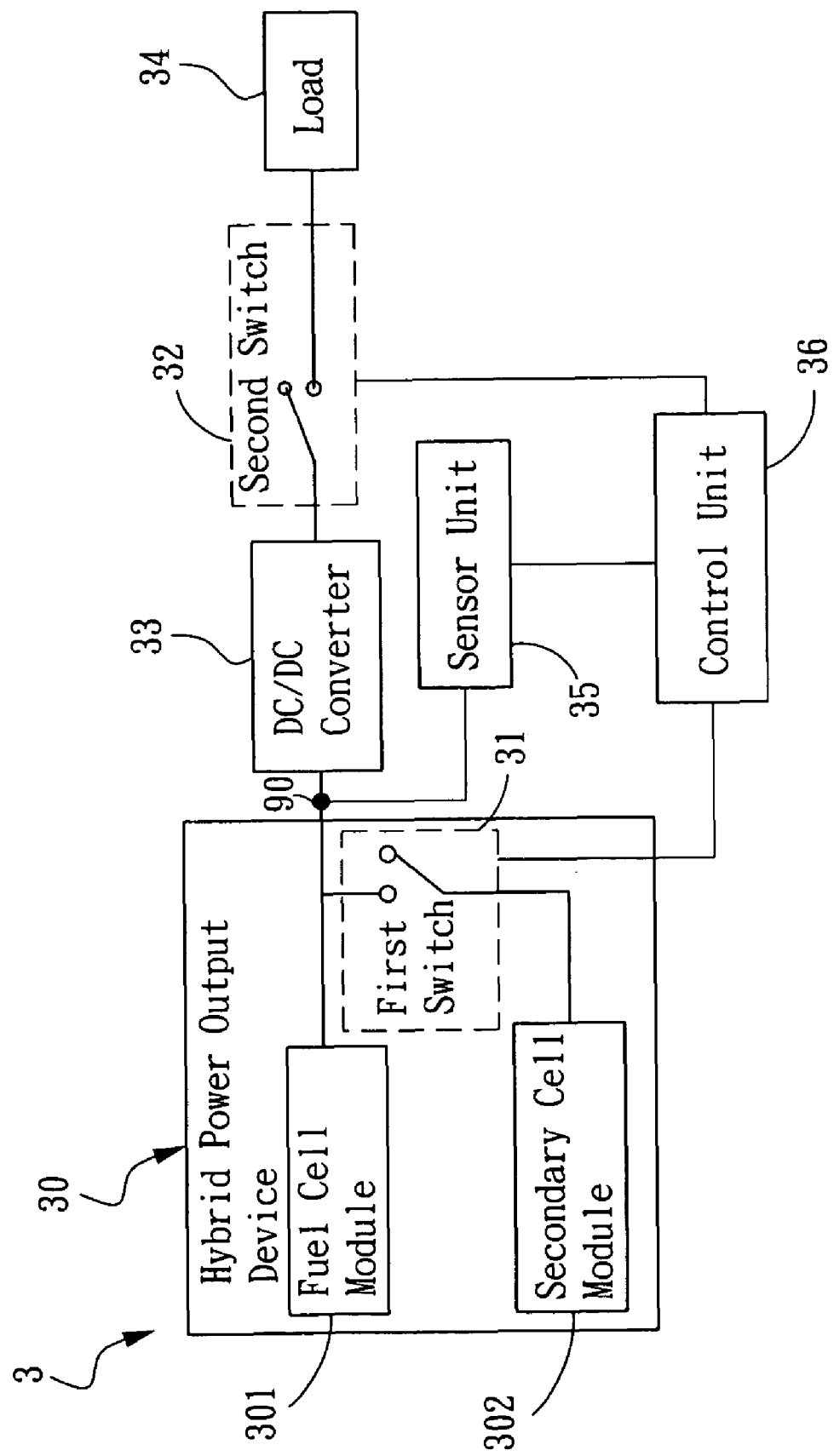
FIG. 2A is a schematic diagram of a system of hybrid power management according to one embodiment of the present invention.
Figure 2B:
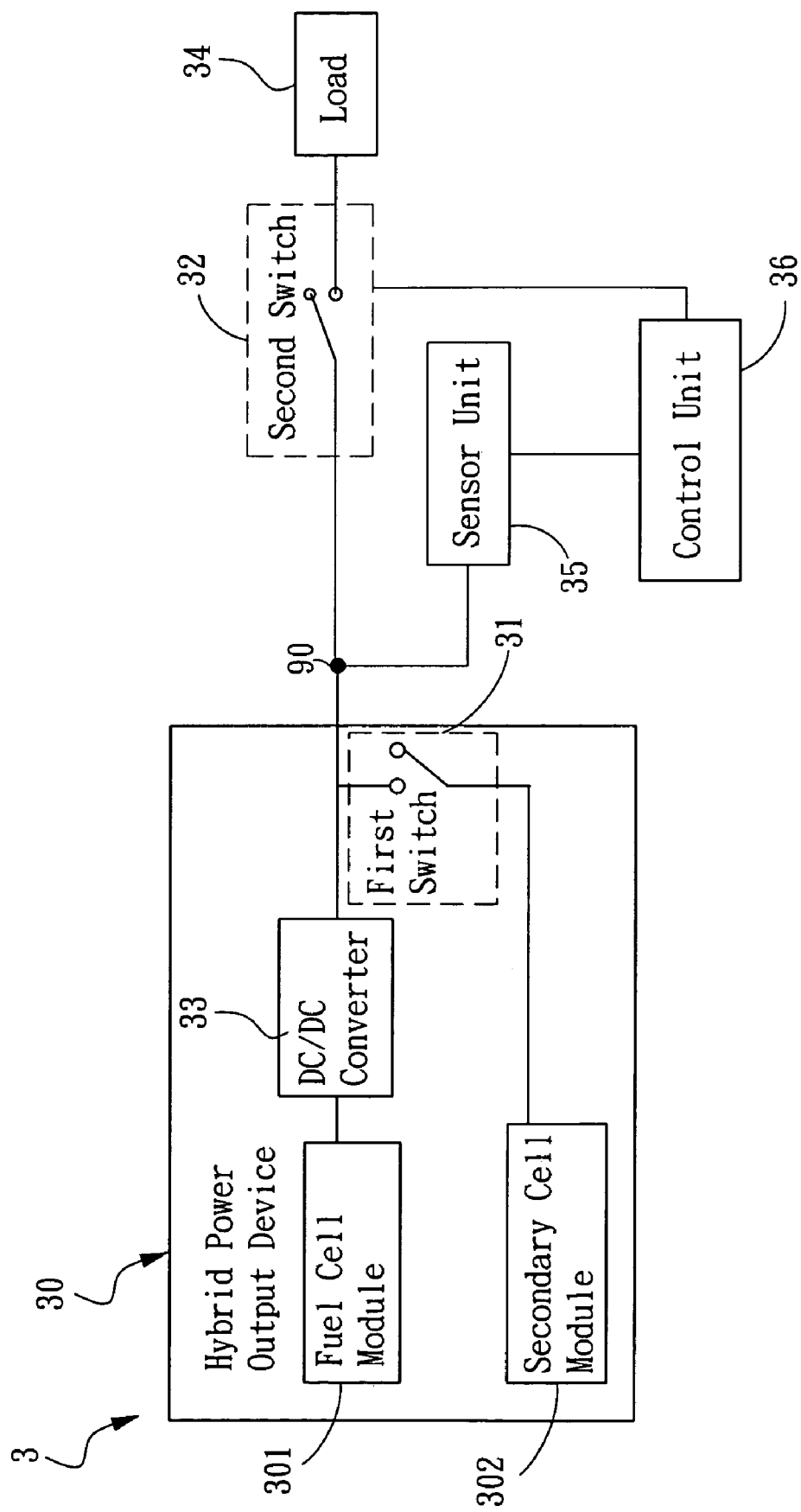
FIG. 2B is a schematic diagram of a system of hybrid power management according to another embodiment of the present invention.
Figure 2C:
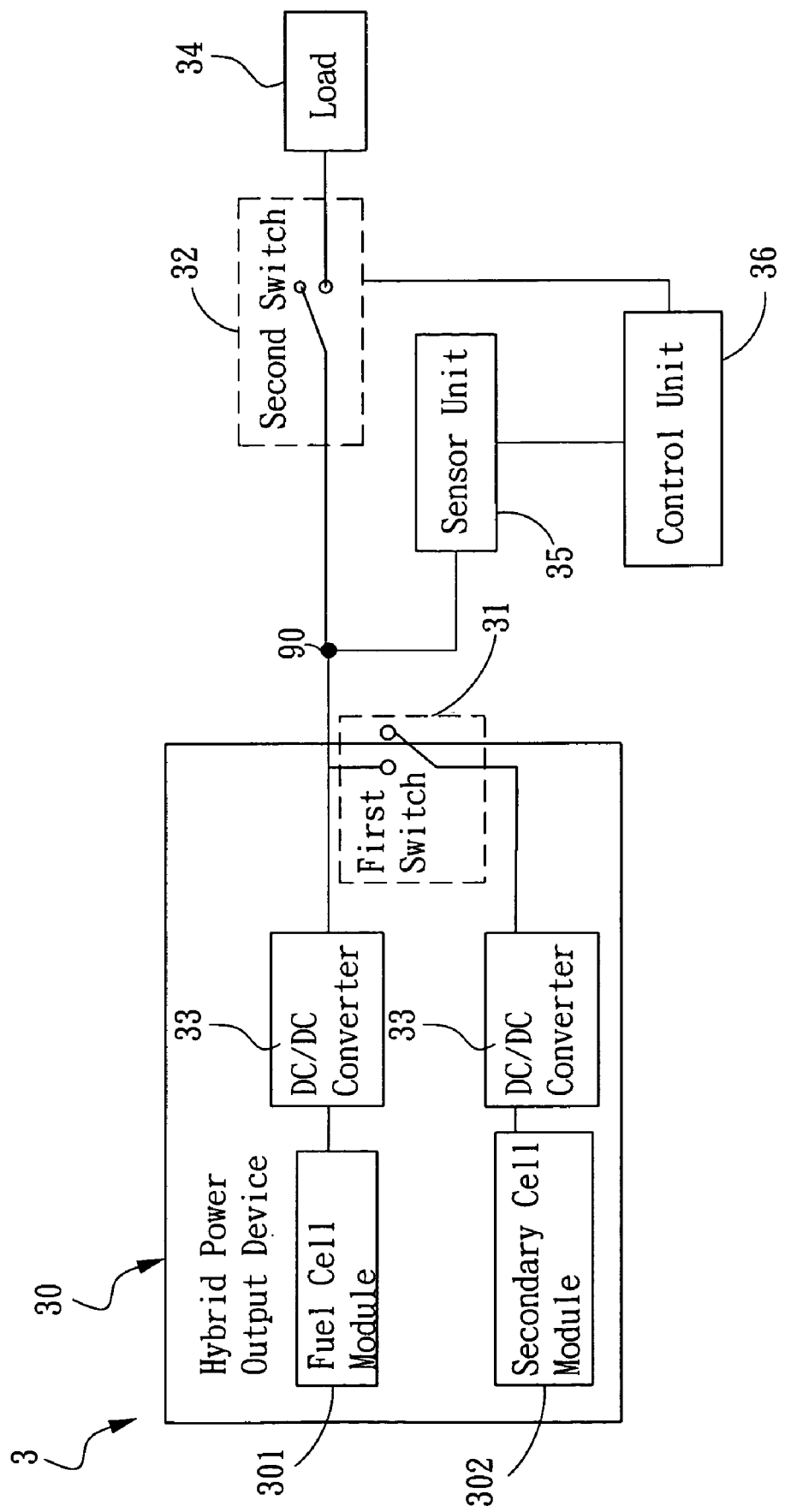
FIG. 2C is a schematic diagram of a system of hybrid power management according to still another embodiment of the present invention.

The load 34 is electrically coupled to the hybrid power output device 30 through a second switch 32. The sensor unit 35 is capable of monitoring a characteristic value from the fuel cell module 301 to generate a sensor signal. The sensor unit 35 is capable of determining the characteristic value to be detected. For example, if the characteristic value is a voltage value, the sensor unit is a voltmeter; if the characteristic value is a current value, the sensor unit is a current meter. In the present embodiment, the sensor unit 35 is a voltmeter. The control unit 36 is capable of determining a plurality of threshold values. Each threshold value represents one of a plurality of output power modes of the hybrid power output device 30 respectively. The control unit 36 receives the sensor signal through the sensor unit 35 and compares the sensor signal with the threshold values according to the trend of the sensor signal to control the first switch 31 or the second switch 32 to determine one of the output power modes to supply power to the load 34. Moreover, a DC/DC converter 33 is further disposed between the hybrid power output device 30 and the load 34, as shown in FIG. 2B. In the system of hybrid power management in another embodiment of the present invention, the DC/DC converter 33 is directly coupled to the fuel cell module 301. Alternatively, as shown in the embodiment in FIG. 2C, each of two DC/DC converters 33 is coupled respectively to the fuel cell module 301 and the secondary cell module 302.

Figure 4A:
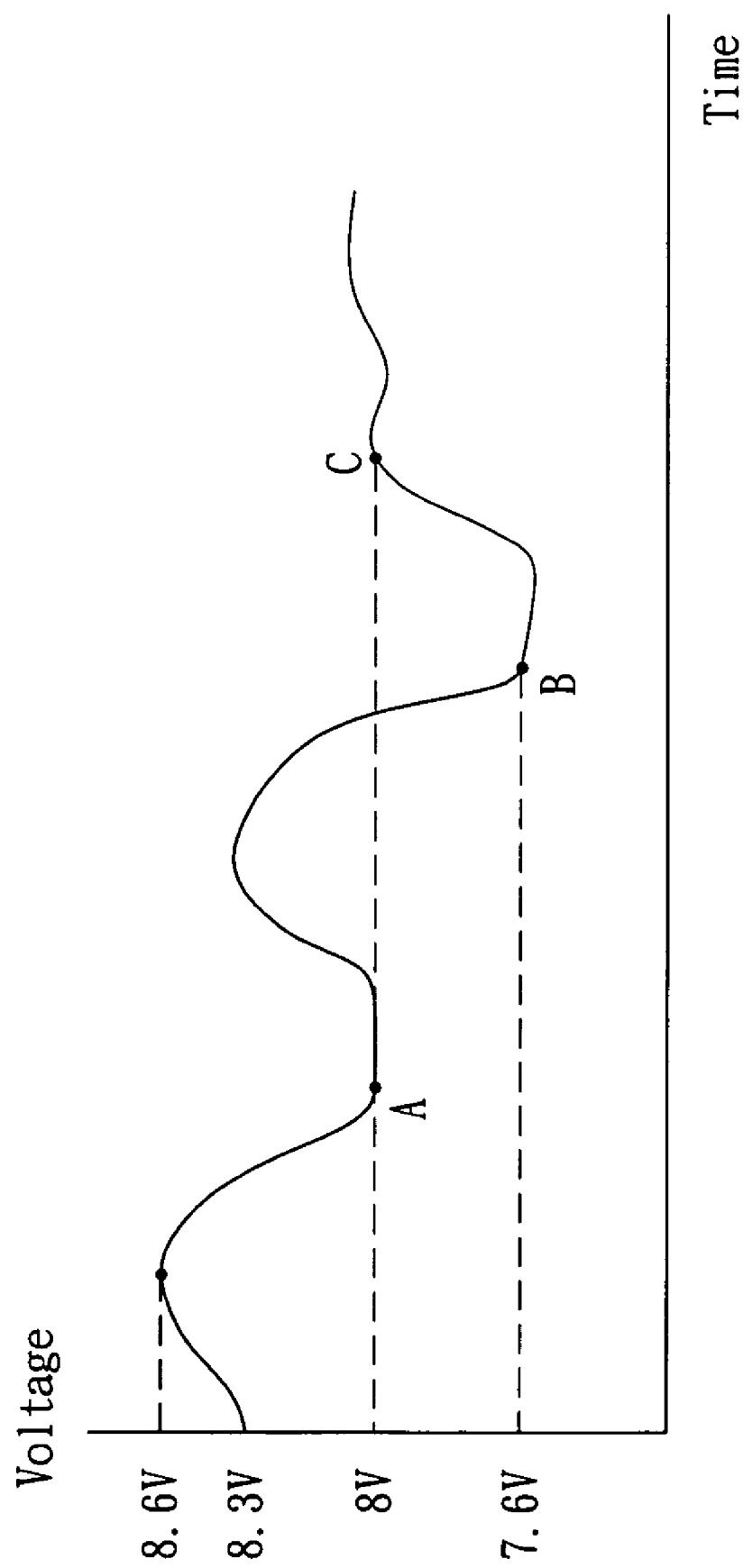
FIG. 4A is a graph showing the characteristic value of a fuel cell module with a load as a function of time according to one embodiment of the present invention.

The system of hybrid power management of the present invention is implemented as described hereinafter. Please refer to FIG. 3 and FIG. 4A, where FIG. 3 is a table showing the relation between threshold values and switch operations according to one embodiment of the present invention and FIG. 4A is a graph showing the characteristic value of a fuel cell module with a load as a function of time according to one embodiment of the present invention. In other words, FIG. 4A shows curve obtained by monitoring the voltage (representing the output voltage of the fuel cell module) at a monitor point 90 using a sensor unit 35. In the present embodiment, there are three threshold values, namely, the first threshold value of 8.6 volts, the second threshold value of 8 volts and the third threshold value of 7.6 volts, respectively, in FIG. 3.

The system of hybrid power management of the present invention is implemented as described hereinafter. Referring to FIG. 2A, the output voltage monitored at the monitor point 90 of the fuel cell module 301 is 8.3 volts. Then, since the power required to be supplied to the load 35 is not large, the fuel cell module 301 is capable of supplying the power to the load 35. Therefore, the first switch 31 is off and the second switch 32 is on, while only the fuel cell module 301 supplies power to the load 35.

As the power required to be supplied to the load 35 increases, the output voltage of the fuel cell module 301 detected by the sensor unit 35 drops to 8 volts (point A). In order to prevent insufficient power supply from the fuel cell module 301, the control unit 36 controls the first switch 31 to be on so that both the fuel cell module 301 and the secondary cell module 302 supply power to the load 34 to keep normal operations. If the power required to be supplied to the load 34 increases, the output voltage of the fuel cell module 301 continuously decreases. If the output voltage of the fuel cell module 301 detected by the sensor unit 35 drops to 7.6 volts (point B), the control unit 36 controls the second switch 32 to be off so that the fuel cell charges the secondary cell module 302 to recover the power therein because the output power is insufficient for the load. As the output voltage of the secondary cell module 302 rises to 8 volts (point C), the control unit 36 controls the second switch 32 to be on so that both the fuel cell module 301 and the secondary cell module 302 supply power to the load 34 to keep normal operations.

Figure 4B:
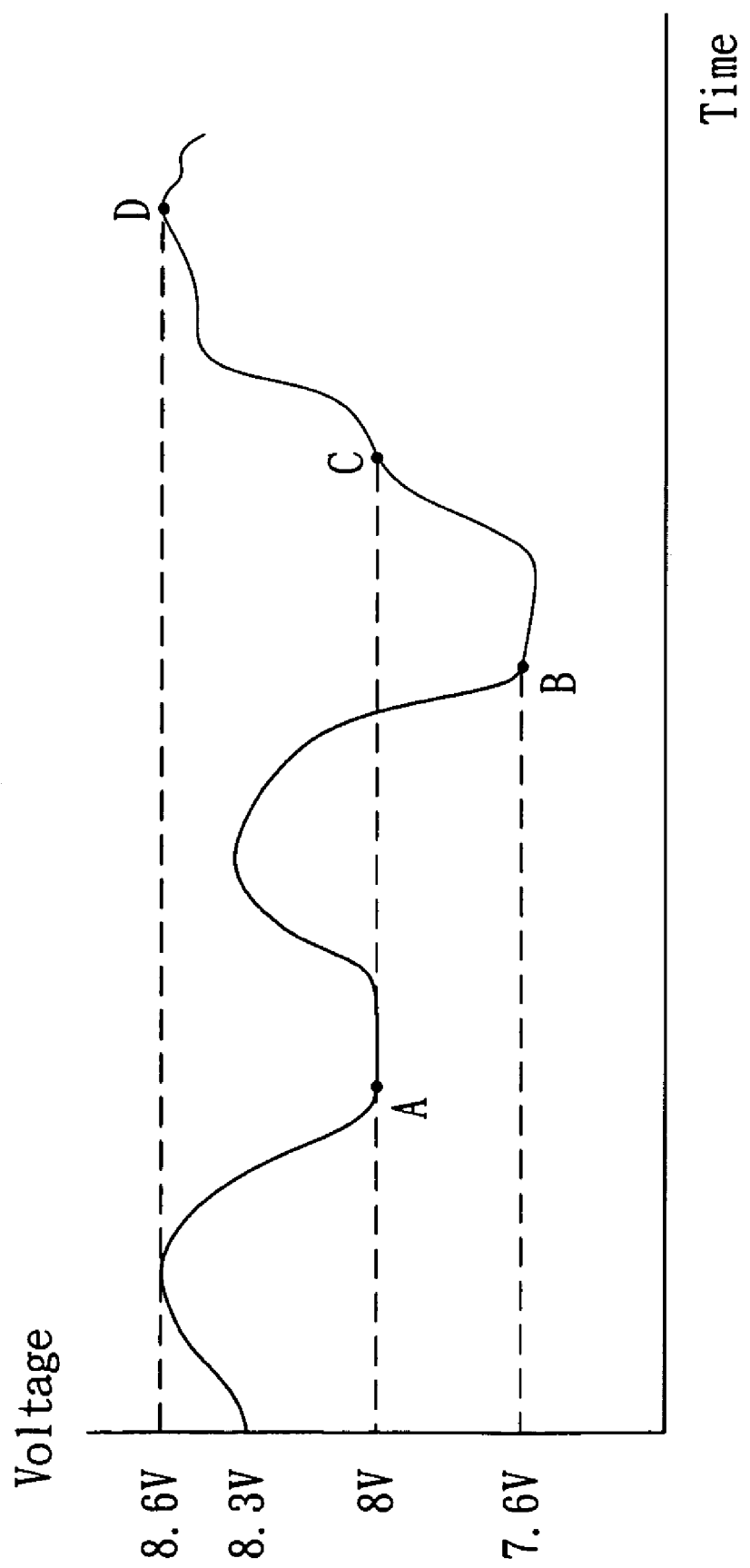
FIG. 4B is a graph showing the characteristic value of a fuel cell module with a load as a function of time according to another embodiment of the present invention.

In another case as shown in FIG. 4B, if the power required by the load is smaller, the output power of the fuel cell module 301 may rise to 8.6 volts (point D). Meanwhile, the control unit 36 controls the first switch 31 to be off and the second switch 32 to be on so that only the fuel cell module 301 supplies power to the load 34. This happens because the fuel cell module 301 charges the secondary cell module 302 as the power required by the load gets smaller so that the output power of the fuel cell module 301 returns to point D once the secondary cell module 302 is fully charged.

Figure 6:
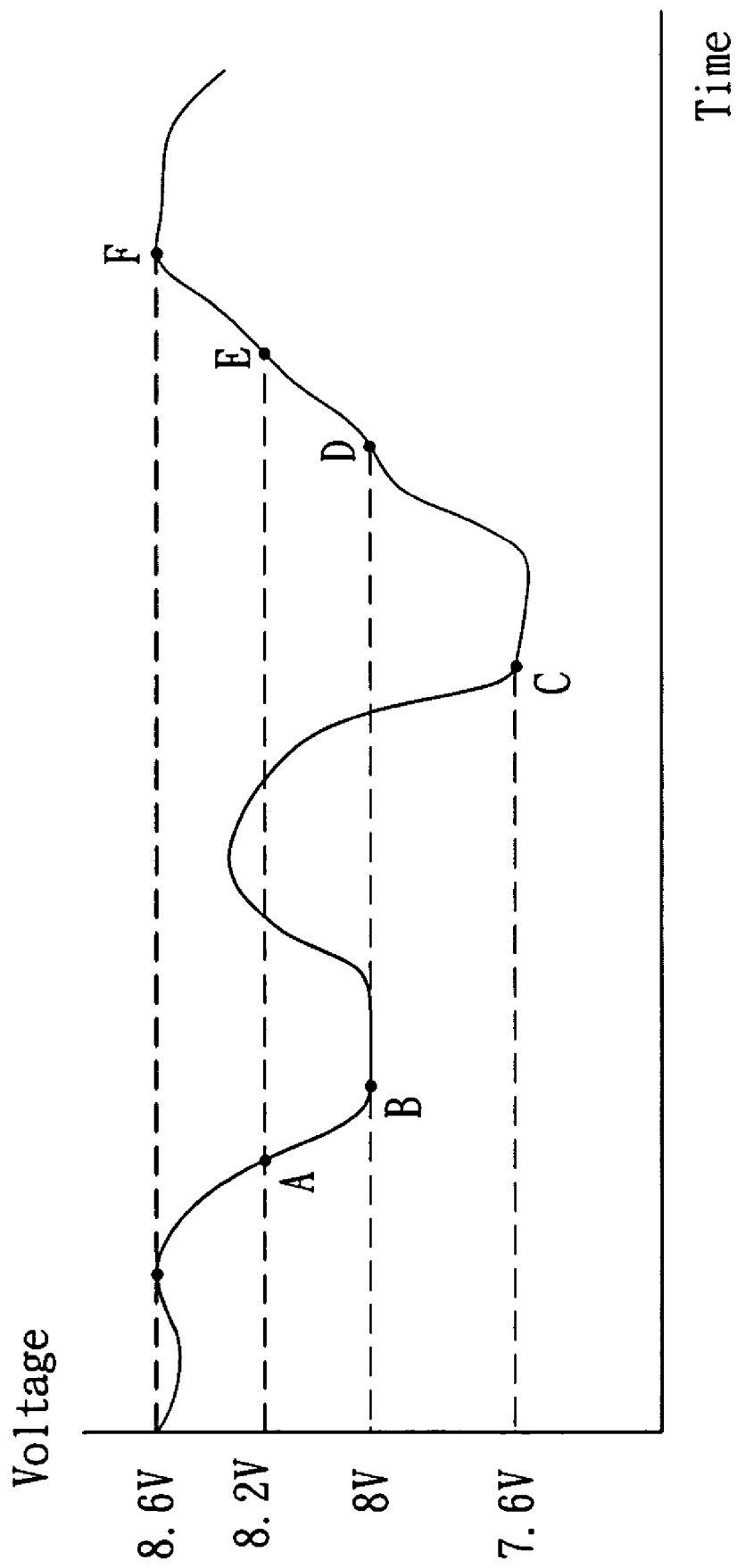
FIG. 6 is a graph showing the characteristic value of a fuel cell module with a load of FIG. 2A as a function of time.

Please refer to FIG. 5 and FIG. 6, wherein FIG. 5 is a table showing the relation between threshold values and switch operations according to another embodiment of the present invention, and FIG. 6 is a graph showing the characteristic value of a fuel cell module with a load of FIG. 2A as a function of time. In the present embodiment, four threshold values are used, namely the first threshold value of 8.6 volts, the second threshold value of 8.2 volts, the third threshold value of 8 volts and the fourth threshold value of 7.6 volts in FIG. 5, respectively. The system of hybrid power management in FIG. 2A is implemented as described hereinafter. In the beginning, the output voltage of the fuel cell module 301 is 8.6 volts. Since the power required by the load 34 is not large, the power supplied from the fuel cell module 301 to the load is sufficient so that the first switch 31 is off and the second switch 32 is on. Then, as the power required by the load 34 increases, the output voltage of the fuel cell module 301 drops accordingly. When the voltage of the fuel cell module 301 drops and passes through the second threshold value (point A) the first switch 31 and the second switch 32 remain their previous states because the first threshold value decreases. In other words, the first switch 31 is off and the second switch 32 is on.

When the output voltage of the fuel cell module 301 detected by the sensor unit 35 drops to the third threshold value (point B), the control unit 36 controls the first switch 31 to be on and the second switch 32 to be on so that both the fuel cell module 301 and the secondary cell module 302 output power to keep the load 34 operating normally. As the output voltage of the fuel cell module 301 drops to the fourth threshold value of 7.6 volts (point C) since the power required by the load 34 increases, the control unit 36 controls the second switch 32 to be off to protect the fuel cell module 301.

After the second switch 32 is switched to off, the fuel cell module 301 charges the secondary cell module 302 to recover its power. Meanwhile, the first switch 31 and the second switch 32 are switched according to the state corresponding to the voltage increasing from the fourth threshold value. For example, when the output power of the fuel cell module 301 detected by the sensor unit 35 is at the third threshold value 8 volts (point D), the second switch 32 is kept off in order for the fuel cell module 301 to recover power so that the fuel cell module 301 can supply sufficient power to the load 34 after the second switch 32 is on. When the output power of the fuel cell module 301 is at the second threshold value (point E), the second switch 32 is switched to on so that both the fuel cell module 301 and the secondary cell module 302 supply power to the load 34. If the output voltage of the fuel cell module 301 increases to the first threshold value of 8.6 volts, the control unit 36 switches the first switch 31 to be off and the second switch 32 to remain on. In other words, only the fuel cell module 301 keeps charging the load. In this manner, the characteristic value of the fuel cell module 301 is repeatedly detected to control the output power according to the relation between threshold values and switch operations in FIG. 5.

According to the above discussion, it is apparent that the present invention discloses a method of hybrid power management and a system of hybrid power management, in which one of different output power modes is selected according to a characteristic value output from a fuel cell module. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method of hybrid power management, comprising steps of
providing a hybrid power output device being coupled to a load and comprising a fuel cell module and a secondary cell module;
determining a plurality of threshold values, each representing one of a plurality of output power modes of the hybrid power output device respectively; and
monitoring a characteristic value output from the fuel cell module and comparing the characteristic value with the threshold values to determine one of the output power modes to supply power to the load.

2. The method of hybrid power management as recited in claim 1, wherein the plurality of threshold values comprise a first threshold value representing the output power mode that the fuel cell module supplies power to the load, a second threshold value representing the output power mode that the fuel cell module and the secondary cell module supply power to the load, and a third threshold value representing the output power mode that power to the load from the hybrid power output device is cut off.

3. The method of hybrid power management as recited in claim 1, wherein the plurality of threshold values comprise a first threshold value representing the output power mode that the fuel cell module supplies power to the load, a second threshold value representing one selected from the output power mode that the fuel cell module supplies power to the load and the output power mode that the fuel cell module and the secondary cell module supply power to the load according to the trend of the characteristic value, a third threshold value representing one selected from the output power mode that the fuel cell module and the secondary cell module supply power to the load and the output power mode that power to the load from the hybrid power output device is cut off, and a fourth threshold value representing the output power mode that power to the load from the hybrid power output device is cut off.

4. The method of hybrid power management as recited in claim 3, wherein the trend of the characteristic value is dropping from the first threshold value to the second and the third threshold values or rising from the fourth threshold value to the second and the third threshold values.

5. The method of hybrid power management as recited in claim 1, further comprising a step wherein the fuel cell module charges the secondary cell module.

6. A system of hybrid power management, comprising:
a hybrid power output device comprising a fuel cell module and a secondary cell module being electrically coupled to the fuel cell module through a first switch;
a load being electrically coupled to the hybrid power output device through a second switch;
a sensor unit being capable of monitoring a characteristic value output from the fuel cell module to generate a sensor signal; and
a control unit being capable of determining a plurality of threshold values, each representing one of a plurality of output power modes of the hybrid power output device respectively and being capable of receiving the sensor signal and comparing the sensor signal with the threshold values to control the first switch or the second switch to determine one of the output power modes to supply power to the load.

7. The system of hybrid power management as recited in claim 6, wherein the plurality of threshold values comprise a first threshold value representing the output power mode that the first switch is off and the second switch is on, a second threshold value representing the output power mode that the first switch and the second switch are both on, and a third threshold value representing the output power mode that the second switch is off.

8. The system of hybrid power management as recited in claim 6, wherein the plurality of threshold values comprise a first threshold value representing the output power mode that the first switch is off and the second switch is on, a second threshold value representing one selected from the output power mode that the first switch and the second switch are both on and the output power mode that the first switch is off and the second switch is on according to the trend of the sensor signal, a third threshold value representing one selected from the output power mode that the fuel cell module and the secondary cell module supply power to the load and the output power mode that power to the load from the hybrid power output device is cut off, and a fourth threshold value representing the output power mode that the second switch is off.

9. The system of hybrid power management as recited in claim 8, wherein the trend of the sensor signal is dropping from the first threshold value to the second and the third threshold values or rising from the fourth threshold value to the second and the third threshold values.

10. The system of hybrid power management as recited in claim 6, further comprising a DC/DC converter disposed between the fuel cell module and the secondary cell module.

11. The system of hybrid power management as recited in claim 6, further comprising a DC/DC converter disposed between the hybrid power output device and the load.

12. The system of hybrid power management as recited in claim 6, further comprising a DC/DC converter disposed between the fuel cell module and first switch.

* * * * *